(12) United States Patent
Situ et al.

(10) Patent No.: US 11,609,599 B2
(45) Date of Patent: Mar. 21, 2023

(54) ELECTRONIC DEVICE WITH MULTIPLE PROCESSORS AND SYNCHRONIZATION METHOD THEREOF

(71) Applicant: Shanghai Zhaoxin Semiconductor Co., Ltd., Shanghai (CN)

(72) Inventors: Jiamin Situ, Beijing (CN); Zhenhua Huang, Beijing (CN); Yang Shi, Beijing (CN); Jun Wu, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/509,374

(22) Filed: Oct. 25, 2021

(65) Prior Publication Data

US 2022/0137661 A1     May 5, 2022

(30) Foreign Application Priority Data

Oct. 30, 2020   (CN) .......................... 202011187271.4

(51) Int. Cl.
    *G06F 1/12*     (2006.01)
(52) U.S. Cl.
    CPC ..................... *G06F 1/12* (2013.01)
(58) Field of Classification Search
    CPC ......................................................... G06F 1/12
    See application file for complete search history.

(56) References Cited

U.S. PATENT DOCUMENTS

| | | | |
|---|---|---|---|
| 6,553,504 B1 | 4/2003 | Katzenelson et al. | |
| 9,742,513 B2* | 8/2017 | Fukano | H04J 3/0691 |
| 10,644,867 B2* | 5/2020 | Yan | H04W 56/0015 |
| 2005/0033947 A1 | 2/2005 | Morris et al. | |
| 2013/0326256 A1* | 12/2013 | Gerwig | G06F 1/12 713/375 |
| 2019/0073225 A1* | 3/2019 | Mace | G06F 9/3822 |

FOREIGN PATENT DOCUMENTS

| | | |
|---|---|---|
| CN | 107181553 A | 9/2017 |
| WO | 2010/038459 A1 | 4/2010 |

OTHER PUBLICATIONS

Chinese language office action dated 2022-06-29, issued in application No. CN 202011187271.4.

* cited by examiner

*Primary Examiner* — Keshab R Pandey
(74) *Attorney, Agent, or Firm* — McClure, Qualey & Rodack, LLP

(57) ABSTRACT

An electronic device comprises a first processor, a second processor and a communication interface. The first processor operates according to a first clock, and comprises a first time-stamp counter to count the first clock to obtain a first count value. The second processor operates according to a second clock, and comprises a second time-stamp counter to count the second clock to obtain a second count value. The communication interface is coupled between the first processor and the second processor. The first processor periodically sends the first count value to the second processor through the communication interface. When the second processor receives the first count value, the second processor adds a preset deviation value to the first count value to obtain a synchronization value, resets the second count value, and the sum of the synchronization value and the second count value is read by the second processor.

17 Claims, 2 Drawing Sheets

ELECTRONIC DEVICE WITH MULTIPLE PROCESSORS AND SYNCHRONIZATION METHOD THEREOF

CROSS REFERENCE TO RELATED APPLICATIONS

This application claims priority to and the benefit of China Application No. 202011187271.4, filed on Oct. 30, 2020, the entirety of which is incorporated by reference herein.

FIELD OF THE INVENTION

The invention is related to an electronic device, and in particular it is related to an electronic device with a plurality of processors, and a synchronization method between the processors in the electronic device.

DESCRIPTION OF THE RELATED ART

It is normal for today's electronic devices to have at least two processors. These processors, especially when located in different sockets, often comprise different clock sources. Although these processors with the processor clocks are operated in the same frequency, these processors have different count values of the respective processor clock because of different clock sources. Therefore, avoiding an interruption or crash of the program running due to the difference in the count values of the respective processor clock between the processors is an important issue.

In the existing synchronization method between multiple processors, a slave processor needs to be synchronized based on the master processor. First, the master processor and the slave processor will respectively count the processor clock (generally count the base frequency of the processor clock, such as 100 MHz) since the electronic device is powered on. For example, the master processor and the slave processor calculate the number of rising or falling edges of the processor clock to obtain a count value respectively, herein the count value is called a time stamp count value. The time stamp count value will be read by the operating system (OS) or other programs. If the time stamp count values read from the master processor and the slave processor are too different, it will cause the hang of the operating system or the other programs.

In order to synchronize the time stamp count value of the slave processor with that of the master processor, a method of the conventional technology is that the master processor sends its own processor clock signal to the slave processor directly, the slave processor counts the received processor clock signal and compares the obtained count value with its own time stamp count value to confirm whether the two values are consistent. In the above-mentioned method in which the master processor sends its processor clock signal directly to the slave processor, only one wire is needed. However it is difficult to compensate for the signal delay of only one wire.

BRIEF SUMMARY OF THE INVENTION

In order to resolve the issue described above, an embodiment of the invention provides an electronic device with a plurality of processors. The electronic device comprises a first processor, a second processor and a communication interface. The first processor operates according to a first clock, and comprises a first time-stamp counter to count the first clock to obtain a first count value. The second processor operates according to a second clock, and comprises a second time-stamp counter to count the second clock to obtain a second count value. The communication interface is coupled between the first processor and the second processor. The first processor periodically sends the first count value to the second processor through the communication interface. When the second processor receives the first count, the second processor adds a preset deviation value to the first count value of the first processor to obtain a synchronization value, and resets the second count value, and a sum of the synchronization value and the second count value is read by the second processor to implement synchronization. The moment that the second processor receives the first count value, the first time-stamp counter accumulates the first count value to an updated first count value, and the synchronization value is equal to the updated first count value.

An embodiment of the invention also provides a synchronization method. The synchronization method is applicable between a first processor and a second processor, to provide a first count value of the first processor to the second processor for synchronization. The synchronization method comprises the following steps. The first processor operates according to a first clock. The first processor counts the first clock to obtain the first count value. The first processor periodically sends the first count value to the second processor. The second processor operates according to a second clock. The second processor counts the second clock to obtain a second count value. The second processor periodically receives the first count value from the first processor. Upon receiving the first count value, the second processor adds a preset deviation value to the first count value to obtain a synchronization value. The second processor resets the second count value. The second processor reads a sum of the synchronization value and the second count value to implement synchronization.

The aforementioned electronic device with a plurality of processors and the synchronization method of the present invention can eliminate the signal delay caused by the time delay of transmitting the time stamp counter value between different processors, and can eliminate the counting errors of the time-stamp counters in different processors, so that different processors can be synchronized with each other periodically, reducing the chance of errors when executing programs.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE INVENTION

In any case, a person skilled in the art may realize that this disclosure can still be implemented without one or more details or with other methods. For other examples, well-known structures or operations are not listed in detail to avoid confusion of this disclosure. The present disclosure is not limited by the described behavior or sequence of events, for example, some behaviors may occur in a different sequence or occur simultaneously under other behaviors or events. In addition, not all described actions or events need to be executed using the same method as the existing disclosure.

In order to solve the problem of signal delay between the master processor and the slave processor due to the circuit layout, the present invention excludes the method of transmitting the processor clock signal between the master processor and the slave processor using a single transmission line. Instead, a Tweeter communication interface is configured between the master processor and the slave processor. The Tweeter communication interface belongs to a custom serial bus protocol. In addition to transmitting the time-stamp counter, it can also transmit other kinds of synchronization data of different processors between them, such as processor voltage identity (VID) which is used to control the consistency of voltages between different processors, or for example, the enable signals of different cores in a processor, which is used to control the number of active cores in the processor. In some embodiments, when the slave processor needs to synchronize its internal clock with the master processor, the master processor will first send a Tweeter packet to the slave processor through the Tweeter communication interface. In some embodiments, the Tweeter packet includes 43 bits in total, herein the first 11 bits are a header, and the last 32 bits are the data to be transmitted. Since the size of the time stamp count value of the processor (for example, the master processor) is 64 bits, the master processor needs to continuously send two Tweeter packets to the slave processor to completely send the time stamp count value of itself (the master processor) to the slave processor. After the slave processor receives the two Tweeter packets, the slave processor combines the two 32-bit data in Tweeter packets to obtain the 64-bit time stamp count value of the master processor.

Figure 1:
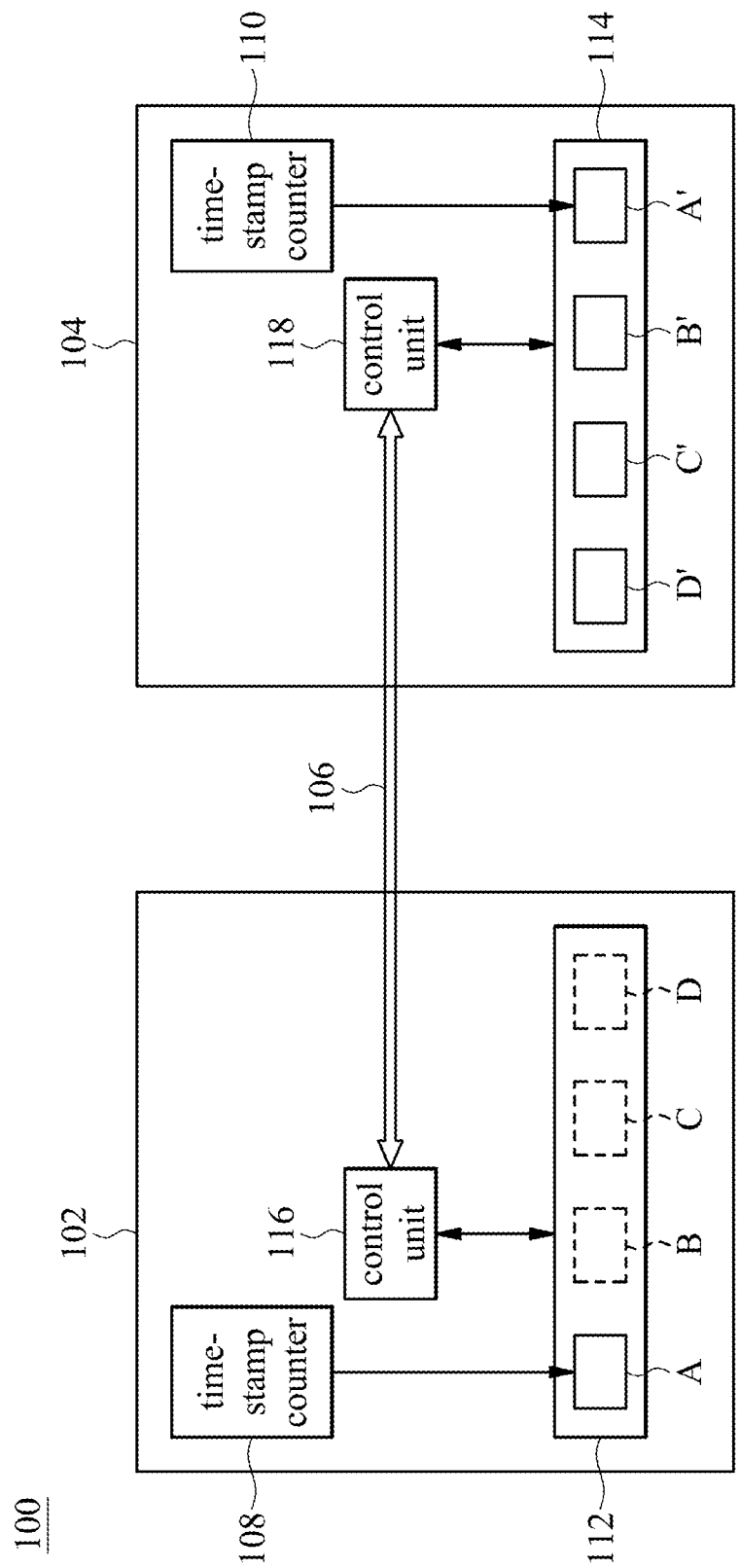
FIG. 1 is a schematic diagram of an electronic device 100 in accordance with some embodiments of the disclosure.

FIG. 1 is a schematic diagram of an electronic device 100 in accordance with some embodiments of the disclosure. As shown in FIG. 1, the electronic device 100 comprises a processor 102, another processor 104 and a communication interface 106. In some embodiments, the processor 102 is a master processor, and the processor 104 is a slave processor. The present invention periodically synchronizes the time stamp count value of the internal clock (processor clock) of the processor 104 with that of the processor 102 to eliminate the shut down or hang of the operating system or other programs that read the time stamp count value, herein the shut down or hang of the operating system or the other programs is caused by the large difference in the time stamp count values of the processors 102 and 104. Similarly, in some embodiments, the processor 102 is the slave processor, and the processor 104 is the master processor. The present invention also synchronizes the time stamp count value of the internal clock of the processor 102 with that of the processor 104. The processor 102 comprises a time-stamp counter 108, a register group 112 and a control unit 116. The processor 104 comprises a time-stamp counter 110, a register group 114 and a control unit 118. The time-stamp counter 108 counts a first clock to obtain a first count value since the processor 102 is powered on, and stores the first count value in the register group 112, herein the processor 102 operates according to the first clock. The time-stamp counter 110 counts a second clock to obtain a second count value since the processor 104 is powered on, and stores the second count value in the register group 114, herein the processor 104 operates according to the second clock.

In some embodiments, the registers of the register group 112 and the register group 114 are all model specific registers (MSR), which are usually needed to be accessed through processor-specific instructions RDMSR and WRMSR. In addition to storing the first count value from the time-stamp counter 108, the register group 112 stores the received count values from other processors and a preset deviation value. In addition to storing the second count value from the time-stamp counter 110, the register group 114 also store the received count values from other processors and the preset deviation value. In some embodiments, for storing the above-mentioned values, the register group 112 comprises three different registers A/B/C with different addresses, and the register group 114 comprises three different registers A'/B'/C' with different addresses. In some embodiments, the register group 112 further comprises a register D, and the register group 114 further comprises a register D'. The registers D and D' are used to set the frequencies of the internal clocks of the processors 102 and 104, and set the interval period of transmitting the first/second count value to the other party through the Tweeter packet. For example, in some embodiments, the processor 102 stores its own first count value in the register A, stores the received count values from other processors in the register B, stores the preset deviation value in the register C, and stores the selection of internal clock and the set of the interval period of transmitting the first/second count value to the other party in a register D (not shown). For example, when the processor 102 sets a bit (for example, bit [0]) of the register D to "1'b1", the internal clock (base frequency) of the processor 102 is 100 MHz. When the processor 102 sets the bit of the register D to "1'b0", the internal clock of the processor 102 is 50 MHz. Furthermore, the processor 102 may be used to set another bits (for example, bit [63:32]) of the register D to adjust the interval period of transmitting the first/second count value to the other party. It should be noted that the interval period must be greater than the time delay of transmitting the first/second count value to the other party (for example, must be greater than the time delay required to transmit two Tweeter packets) at least, depending on the frequency of the system for synchronizing the time stamp count values. In some embodiments, the preset deviation value is set according to a time delay to calibrate the signal delay, herein the time delay is generated from the processor 102 initiates the transmission of the first count value to the processor 104 obtains a synchronization value, and the signal delay is caused by the time delay. The processor 104 obtains the synchronization value by adding the preset deviation value to the received first count value of the processor 102. In some embodiments, the time delay is determined by the transmission distance and the circuit layout between the processors 102 and 104, and the frequency of the processor clock. When the transmission distance and circuit layout of the electronic device 100 are fixed after leaving the factory, the higher the frequency of the processor clock is, the less the time delay is, and the time delay can be calibrated by testing. How to set the preset deviation value may be detailed hereinafter.

It should be noted that the selection of internal clock (for example, required only 1 bit) and the set of the interval period for transmitting the first/second count value to the other party (for example, required only 32 bits) do not require a complete register (for example, 64 bits) to store them. In some embodiments, the registers D and D' are not needed, the selection of internal clock (for example, required only 1 bit), the set of the interval period for transmitting the first/second count value to the other party (for example, required only 32 bits), and the preset deviation value (required only 16 bits) are all stored in the registers C and C'.

When the processor 104 needs to synchronize the internal clock with the processor 102, firstly, the processor 102 reads the first count value currently stored in the register A, and the control unit 116 of the processor 102 periodically sends the first count value to the processor 104 in the form of Tweeter packets through the communication interface 106 (for example, a Tweeter communication interface). After continuously receiving two Tweeter packets, the control unit 118 of the processor 104 combines the data in the received Tweeter packets to obtain the first count value of the processor 102, and stores the first count value in the register B'. The processor 104 adds the first count value in the register B' to the preset deviation value in the register C' to obtain a synchronization value. In some embodiments, due to the aforementioned time delay, when the processor 104 receives the first count value, the time-stamp counter 108 of the processor 102 further accumulates the first count value to an updated first count value, and the synchronization value is equal to the updated first count value. The processor 104 further resets (for example, returns to zero) the second count value originally stored in the register A', and then a sum of the synchronization value and the second count value (zero at this time) is read for synchronization by the processor 104 to implement synchronization. It should be noted that after the synchronization value is obtained, and until the next first counter value is received and the next synchronization value is calculated, the time stamp count value read by the processor 104 at any time is the sum of the synchronization value and the second count value, wherein the second count value is accumulated from zero. In other words, in the embodiment of FIG. 1, after the synchronization value is obtained, and until the next first counter value is received and the next synchronization value is calculated, the time stamp count value read by the processor 104 (such as operating system or other software) at any time is the result of adding the contents stored in the register A' (storing the second count value), the register B' (storing the received first count value), and the register C' (storing the preset deviation value). In FIG. 1, the registers B and C of the processor 102 are represented by dotted lines, because the internal clock of the processor 102 is used as a synchronization reference, the processor 104 does not send the second count value (counted by the time-stamp counter 110) of itself to the processor 102. Therefore, the registers B and C of the processor 102 do not store data. However, the present invention does not limit the synchronization based on the internal clock of the processor 104. In the embodiment that the internal clock of the processor 104 is used as a reference to implement synchronization, the processor 104 sends the second count value (counted by the time-stamp counter 110) of itself to the processor 102, and the registers B and C of the processor 102 respectively store the received second count value and the corresponding preset deviation value. The operation of the processor 102 after receiving the second count value is the same as the foregoing embodiment, and will not be repeated again.

For example, when the processor 104 needs to synchronize the time stamp count value with the processor 102, the current first count value of the time-stamp counter 108 is 1000, and the current second count value of the time-stamp counter 110 is 1002. In other words, the processor 102 and the processor 104 currently have a count error of 2. The control unit 116 of the processor 102 sends the first count value 1000 stored in the register A to the processor 104 in the form of a Tweeter packet through the communication interface 106. When the processor 104 receives the first count value from the processor 102, a time delay is generated from the processor 102 initiates the transmission of the first count value to the processor 104 receives the first count value and calculates the aforementioned synchronization value. During the period of the time delay, the count value of the processor 102 has been accumulated to 1010 (for example, 10 count values have passed). Therefore, the preset deviation value in the register C' of the processor 104 can be set to 10 according to the result of the calibration testing. The processor 104 adds the received first count value of 1000 (temporarily stored in the register B') to the preset deviation value of 10 (temporarily stored in the register C') to obtain a synchronization value of 1010 (1000+10), and resets the second count value (temporarily stored in the register A') that has been counted as 1012 (1002+10) to 0.

Then, as time flies, the time-stamp counters 108 and 110 continue to count respectively. For example, after 20 counts, the first count value of the processor 102 is 1030 (1010+20) (temporarily stored in the register A), the synchronization value obtained by the processor 104 is 1010 previously, and the second count value is accumulated from 0 to 20. At this time, the processor 104 adds the synchronization value of 1010 to the second count value of 20, a new time stamp count value of 1030 (1010+20) is obtained. In other words, after the synchronization value of 1010 is obtained and until the next first counter value is received and the next synchronization value is calculated, the time stamp count value read by the processor 104 (such as operating system or other software) at any time is the result of adding the contents stored in the register A' (storing the second count value which is accumulated to 20), the register B' (storing the received first count value of 1000), and the register C' (storing the preset deviation value of 10). The new time stamp count value calculated by the processor 104 can still be equal to an updated first count value (1030) accumulated by the time-stamp counter 108 of the processor 102. Thus, before the processor 102 periodically outputs its updated first count value to the processor 104 again, the processor 104 is still synchronized with the processor 102. In some embodiments, if the second count value (1002+10) of the time-stamp counter 108 of the processor 102 is not reset to zero during synchronization, after 20 counts have passed after synchronization, the first count value counted by the time-stamp counter 108 of the processor 102 is 1030 (1010+ 20), but the second count value counted by the time-stamp counter 110 of the processor 104 is 1032 (1002+10+20). There is a count error of 2 counts between the second count value and the first count value. The count error must wait to be eliminated until the next synchronization is executed again, that is, after the processor 102 sends a new first count value (1030) to the processor 104 in the form of a Tweeter packet again.

Therefore, the synchronization value obtained by the processor 104 is equal to an updated first count value accumulated by the time-stamp counter 108 of the processor 102 when the processor 104 receives the first count value (1000), which are all 1010. The synchronization value and the updated first count value are all 1010, so that the synchronization of the time-stamp counter values between the processor 104 and the processor 102 is completed. In addition, since the second count value of the register A' in the processor 104 becomes zero, the count error caused by the time-stamp counter 110 is also directly eliminated. In other words, the electronic device 100 of the present invention not only eliminates the time delay caused by the transmission distance and the circuit layout between the processors 102 and 104, but also eliminates the count error of the time-stamp counter 108 or the time-stamp counter 110 itself, so that the time stamp count value of the processors 102 and 104 can be synchronized with each other periodically, reducing the chance of errors when executing programs. In some embodiments, the first count value received by the processor 104 from the processor 102 is stored in the register B' at address 0x16a9. In some embodiments, by adjusting the setting value in bit [0] of the registers D and D' at address 0x16a8, the internal clocks of the processors 102 and 104 can be set respectively.

In some embodiments, the registers D and D' at address 0x16a8 are model specific registers (MSR) with 64 bits, including bits [0]-[63]. By setting the value of bit [0] of registers D and D' at address 0x16a8 to "1'b0", the internal clock of processors 102 and 104 can be set to 50 MHz. By setting the value of bit [0] of registers D and D' at address 0x16a8 to "1'b1", the internal clock of processors 102 and 104 can be set to 100 MHz. In some embodiments, the preset deviation value is stored in bits [8]-[23] of the register D' at address 0x16a8 in the processor 104. When the internal clock is set to 50 MHz and the value in bits [8]-[23] of the register D' at address 0x16a8 is set to "16'd45", the time delay represented by the preset deviation value is 900 nanoseconds. When the internal clock is set to 100 MHz and the value in bits [8]-[23] of the register D' at address 0x16a8 is set to "16'd90", the time delay represented by the preset deviation value is 900 nanoseconds, but the present invention is not limited thereto. Here, the preset deviation value (Offset) can be calculated according to formula (1).

$$\text{Offset} = \frac{\text{Tweeter time}}{\text{Tsc cnt period}} \quad (1)$$

Tweeter time is the abovementioned time delay. Tst cnt period is the period of the internal clock. The time delay is determined by the transmission distance and the circuit layout between the processors 102 and 104 and the frequency $$\left(\text{that is } \frac{1}{\text{Tsc cnt period}}\right)$$

of the internal clock for transmitting time stamp count value. In other words, after the electronic device 100 including multiple processors leaving the factory, the time delay (Tweeter time) can be determined through testing, and then the preset deviation value (Offset) can be calculated according to the above formula (1).

In some embodiments, the processor 102 and the processor 104 further comprise at least one multiplexer (not shown). The input end of the at least one multiplexer is coupled to a 50 MHz clock source and a 100 MHz clock source, wherein the 100 MHz clock source supplies the base frequency of 100 MHz, the 50 MHz clock source supplies the divided frequency of the 100 MHz clock source of 50 MHz. When the value in bit [0] of registers D and D' at address 0x16a8 is set to "1'b0", the at least one multiplexer of the processors 102 and 104 respectively selects the 50 MHz clock source they are coupled to, and outputs the 50 MHz internal clock to the processors 102 and 104 respectively. When the value in bit [0] of registers D and D' at address 0x16a8 is set to "1'b1", the at least one multiplexer of the processors 102 and 104 respectively selects the 100 MHz clock source they are coupled to, and outputs the 100 MHz internal clock to the processors 102 and 104 respectively. It should be noted that the internal clock setting of 100 MHz (base frequency) or 50 MHz (divided frequency) is only an example, the present invention is not limited thereto. In other embodiments, one of three or more clock sources can be selected as the internal clock. In addition, the frequency of the internal clocks of the processors 102 and 104 are the same (for example, both are 100 MHz or both are 50 MHz), but the internal clocks of the processors 102 and 104 are from different clock sources.

Figure 2:
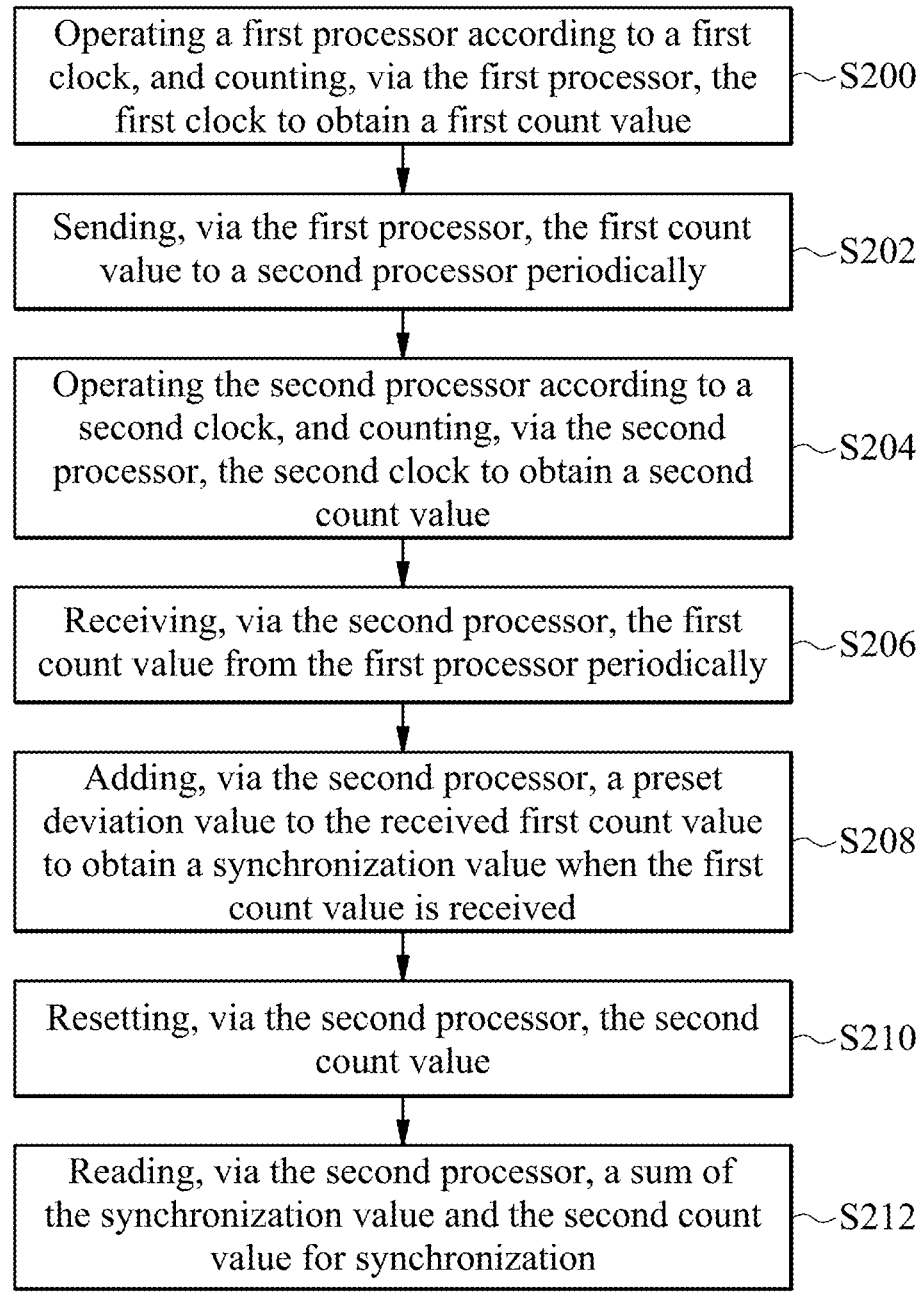
FIG. 2 is a flow chart of a synchronization method for the electronic device 100 in accordance with some embodiments of the disclosure.

FIG. 2 is a flow chart of a synchronization method for the electronic device 100 in accordance with some embodiments of the disclosure. As shown in FIG. 2, the present invention also discloses a synchronization method. The synchronization method is applicable between the processor 102 and the processor 104 in FIG. 1, and is for the processor 104 to read the first count value of the processor 102 to implement synchronization, herein the first count value is obtained by the processor 102 through counting the processor clock of itself. The synchronization method comprises the following steps. The processor 102 operates according to a first clock, and counting the first clock to obtain a first count value (step S200). The processor 102 periodically sends the first count value to the processor 104 (step S202). The processor 104 operates according to a second clock, and counts the second clock to obtain a second count value (step S204). The processor 104 periodically receives the first count value from the processor 102 (step S206). When the first count value is received, the processor 104 adds a preset deviation value to the received first count value to obtain a synchronization value (step S208). The processor 104 resets the second count value (step S210). The processor 104 reads the sum of the synchronization value and the second count value to implement synchronization (step S212). In some embodiments, the time-stamp counter 108 of the processor 102 in FIG. 1 executes step S200, and the control unit 116 of the processor 102 in FIG. 1 executes step S202. In some embodiments, the time-stamp counter 110 of the processor 104 in FIG. 1 executes step S204, and the control unit 118 of the processor 104 in FIG. 1 executes step S206, and the processor 104 in FIG. 1 executes steps S208 and S212. The electronic device and synchronization method of the present invention can eliminate the signal delay caused by the time delay in transmitting the time stamp count value between different processors, and can also eliminate counting errors of the respective time-stamp counters in different processors, so that different processors can be synchronized with each other periodically, reducing the chance of errors when executing programs.

The ordinals in the specification and the claims of the present disclosure, such as "first", "second", "third", etc., have no sequential relationship, and are just for distinguishing between two different components with the same name. In the specification of the present disclosure, the word "couple" refers to any kind of direct or indirect electronic connection. The present disclosure is disclosed in the preferred embodiments as described above, however, the breadth and scope of the present disclosure should not be limited by any of the embodiments described above. Persons skilled in the art can make small changes and retouches without departing from the spirit and scope of the disclosure.

The scope of the disclosure should be defined in accordance with the following claims and their equivalents.

What is claimed is:

1. An electronic device with a plurality of processors, comprising:
    a first processor, operating according to a first clock, and comprising a first time-stamp counter to count the first clock to obtain a first count value;
    a second processor, operating according to a second clock, and comprising a second time-stamp counter to count the second clock to obtain a second count value;
    a communication interface, coupled between the first processor and the second processor;
    wherein the first processor periodically sends the first count value to the second processor through the communication interface;
    when the second processor receives the first count value, the second processor adds a preset deviation value to the first count value of the first processor to obtain a synchronization value, and resets the second count value, and a sum of the synchronization value and the second count value is read by the second processor.

2. The electronic device as claimed in claim 1, wherein when the second processor receives the first count value, the first time-stamp counter accumulates the first count value to an updated first count value, and the synchronization value is equal to the updated first count value.

3. The electronic device as claimed in claim 1, wherein the preset deviation value is set according to a time delay generated from the first processor initiates the transmission of the first count value to the second processor obtains the synchronization value, and is used to calibrate the signal delay caused by the time delay.

4. The electronic device as claimed in claim 1, wherein the preset deviation value is calculated according to the following formula:

$$\text{Offset} = \frac{\text{Tweeter time}}{\text{Tsc cnt period}}$$

wherein Tweeter time is the time delay generated from the first processor initiates the transmission of the first count value to the second processor obtains the synchronization value;
    wherein Tst cnt period is the period of the first clock; and
    wherein the time delay is determined by the transmission distance and the layout between the first processor and the second processor, and the frequency of the first clock.

5. The electronic device as claimed in claim 1, wherein after the synchronization value is obtained and until the next first count value is received, a sum of the preset deviation value, the first count value and the second count value is provided to the second processor for reading; and
    wherein the second count value is accumulated from zero after reset.

6. The electronic device as claimed in claim 1, wherein, the first processor comprises a first register for storing the first count value; and
    the second processor comprises a second register for storing the second count value, a third register for storing the preset deviation value, and a fourth register for storing the first count value.

7. The electronic device as claimed in claim 6, wherein the first, second, third and fourth registers are all model specific registers (MSR).

8. The electronic device as claimed in claim 6, wherein, the first processor further comprises a fifth register; and
    the first processor adjusts the interval period for sending first count value to the second processor by setting the fifth register, and sets the frequency of the first clock by setting the fifth register.

9. The electronic device as claimed in claim 6, wherein, the second processor further comprises a sixth register; and
    the second processor adjusts the preset deviation value by setting the sixth register.

10. The electronic device as claimed in claim 6, wherein, the first processor further comprises a seventh register; and
    the first processor adjusts the interval period for sending first count value to the second processor by setting the seventh register, sets the frequency of the first clock by setting the seventh register, and adjusts the preset deviation value by setting the seventh register.

11. The electronic device as claimed in claim 1, wherein the frequencies of the first clock and the second clock are the same, and the first clock and the second clock are from different clock sources.

12. A synchronization method, applicable between a first processor and a second processor incorporated in an electronic device, for the second processor to read a first count value of the first processor, comprising:
    operating the first processor according to a first clock;
    via the first processor, counting the first clock to obtain the first count value;
    sending the first count value to the second processor periodically;
    operating the second processor according to a second clock;
    via the second processor, counting the second clock to obtain a second count value;
    receiving the first count value from the first processor periodically;
    when received the first count value, adding a preset deviation value to the first count value to obtain a synchronization value;
    resetting the second count value; and
    a sum of the synchronization value and the second count value is read by the second processor.

13. The synchronization method as claimed in claim 12, wherein when the second processor receives the first count value, the first processor accumulates the first count value to an updated first count value, the synchronization value is equal to the updated first count value.

14. The synchronization method as claimed in claim 12, wherein the preset deviation value is set according to a time delay generated from the first processor initiates the transmission of the first count value to the second processor obtains the synchronization value; and
    wherein the preset deviation value is used to calibrate the signal delay caused by the time delay.

15. The synchronization method as claimed in claim 12, wherein the preset deviation value is calculated according to the following formula:

$$\text{Offset} = \frac{\text{Tweeter time}}{\text{Tsc cnt period}}$$

wherein Tweeter time is the time delay generated from the first processor initiates the transmission of the first count value to the second processor obtains the synchronization value;

wherein Tst cnt period is the period of the first clock; and wherein the time delay is determined by a transmission distance and a layout between the first processor and the second processor, and the frequency of the first clock.

16. The synchronization method as claimed in claim 12, wherein after the synchronization value is obtained and until the next first count value is received, the sum of the preset deviation value, the first count value and the second count value is provided to the second processor for reading; and wherein the second count value is accumulated from zero after reset.

17. The synchronization method as claimed in claim 12, wherein the frequencies of the first clock and the second clock are the same, and the first clock and the second clock are from different clock sources.

\* \* \* \* \*